United States Patent Office 3,637,787
Patented Jan. 25, 1972

3,637,787
METHOD FOR THE PREPARATION OF ARYL ISOTHIOCYANATES
Antoine Theofiel Rasschaert and Gaston Jacob Benoy, Berchem, and Jan Frans Van Besauw, Brasschaat, Belgium, assignors to Gevaert-Agfa N.V., Mortsel, Belgium
No Drawing. Filed Dec. 27, 1966, Ser. No. 604,659
Int. Cl. C07c *161/04*
U.S. Cl. 260—454   3 Claims

ABSTRACT OF THE DISCLOSURE

Monoarylthioureas are heated in an inert solvent while introducing hydrogen chloride to produce aryl isothiocyanates. The process is simple and provides good yields.

---

The present invention relates to an improved method for the preparation of aryl isothiocyanates.

There is an increasing interest for isothiocyanates because they are used as starting materials for the preparation of important fine chemicals of use in the pharmaceutical, phytopharmaceutical and photographical industries. In this connection there can be referred to "The dithiocarbamates and Related Compounds" by G. D. Thorn and R. A. Ludwig, Elsevier Publishing Company (1962), to "Organic Sulfur Compounds" by N. Kharash, vol. 1, Pergamon Press (1961) as well as to C.A. vol. 65, 7081 (1966) according to which isothiocyanates would have an inhibitory effect against nitrification of ammonium ions by soil microbes.

Among the methods for the preparation of aryl isothiocyanates one of the most convenient ones is the pyrolysis in a suitable inert solvent of arylthioureas which are readily prepared starting from the corresponding arylamines. This method has been described by J. N. Baxter et al., J. Chem. Soc., 679 (1956).

Surprisingly, it has now been found that the yields obtained according to said method can be considerably increased by effecting the pyrolysis in the presence of hydrogen chloride.

Thus the present invention provides an improved method for the preparation of arylisothiocyanates according to which an arylthiourea is heated in a suitable inert solvent such as chlorobenzene, xylene, and cumene, while introducing hydrogen chloride.

The method according to the invention can be represented by the following reaction scheme:

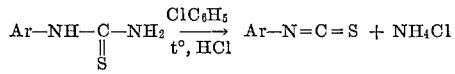

wherein Ar stands for aryl including substituted aryl.

The arylthioureas are prepared analogously to the method described by L. Frank and P. Smith, Org. Synth. Coll., vol. III, 735 (1955), from the corresponding aromatic amines through the intermediary of an aroyl isothiocyanate as represented by the following reaction scheme:

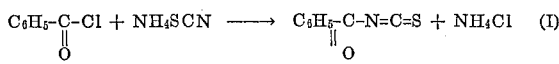

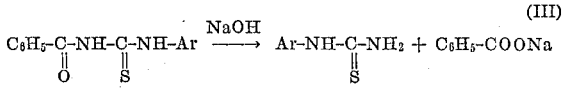

wherein Ar stands for aryl including substituted aryl.

Reactions (I) and (II) cause no difficulties at all and proceed readily. However, the alkaline hydrolysis (III) of the N-aryl-N'-aroyl-thioureas as described by Frank and Smith for N-phenyl-N'-benzoyl-thiourea is not generally applicable since the reaction conditions are too severe and give rise in some cases to rupture of the thioamide bond. Therefore, it has been tried to hydrolyze the N-aryl-N'-aroyl-thioureas in dilute alkaline mediumand surprisingly, it was found that when effecting the hydrolysis by means of an equivalent amount of dilute aqueous sodium hydroxide, say a 0.5–4% by weight aqueous solution of an equivalent amount of sodium hydroxide, reaction (III) occurs readily with much higher yields of very pure product than according to Frank and Smith's method in concentrated solutions of sodium hydroxide.

When the N-aryl group of the N-aryl-N'-aroyl-thiourea bears a strongly electron-withdrawing substituent such as a nitro group, it was experienced that rupture of the thioamide bond takes place even though the hydrolysis medium is only slightly alkaline. It was found to avoid rupture of the thioamide bond and to obtain arylthioureas having electron-withdrawing substituents e.g. a nitro group, by effecting the hydrolysis on N-aryl-N'-aroyl-thiourea having also electron-withdrawing substituents in the aroyl nucleus.

The preparation of the aryl isothiocyanates as well as of the arylthioureas used therefor will be illustrated hereinafter by the preparation of some specific compounds, without however limiting the invention thereto.

(I) PREPARATION OF THE ARYLTHIOUREAS

(A) Preparation of the N-aryl-N'-aroylthioureas

(a) Preparation of the aroyl isothiocyanates

The following preparations illustrate the preparation of the aroyl isothiocyanates.

Preparation 1: Benzoyl isothiocyanate.—In a reaction vessel 160 g. (2 moles) of ammonium thiocyanate are dissolved in 1000 ml. of dry acetone. Then 280 g. (2 moles) of benzoyl chloride are added in about 1 hour with vigorous stirring. The reaction proceeds exothermally and a white precipitate forms gradually. This white precipitate is ammonium chloride. When all the benzoyl chloride has been added the mixture is refluxed for a while. After cooling the precipitate formed is filtered by suction and washed with 200 ml. of acetone. The orange-red solution is immediately used for the preparation of the N-aryl-N'-benzoyl-thiourea.

Analogous preparations.—m-Nitrobenzoyl isothiocyanate are prepared in completely analogous circumstances.

(b) Preparation of the N-aryl-N'-aroyl-thioureas

The following preparations illustrate how the N-aryl-N'-aroyl-thioureas are prepared.

Preparation 2: N-(3,4-dichlorophenyl)-N'-benzoyl-thiourea.—In a reaction vessel a freshly prepared solution of 2 moles of benzoyl isothiocyanate in acetone is placed. With stirring a solution of 324 g. (2 moles) of 3,4-dichloroaniline in 2500 ml. of acetone is added in about 1 hour and a yellow precipitate of N-(3,4-dichlorophenyl)-N'-benzoyl-thiourea forms gradually. When all 3,4-dichloroaniline has been added the mixture is refluxed for about 2 hours. After cooling to room temperature and filtering by suction the precipitate is dried in a drying oven.

Yield: 580 g. (90%).

Melting point: 156° C.

Analogous preparations.—The N-aryl-N'-aroyl-thioureas listed in Table I have been prepared in a completely analogous way using different arylamines.

TABLE I

| Compound | Melting point (° C.) | Yield (percent) |
| --- | --- | --- |
| N-(α-naphthyl)-N'-benzoyl-thiourea | 173 | 85 |
| N-(β-naphthyl)-N'-benzoyl-thiourea | 167 | 84 |
| N-(p-iodophenyl)-N'-benzoyl-thiourea | 153 | 85 |
| N-(p-bromophenyl)-N'-benzoyl-thiourea | 136 | 94 |
| N-(3-pyrenyl)-N'-benzoyl-thiourea | 265 | 87 |
| N-(2-chrysenyl)-N'-benzoyl-thiourea | 255 | 86 |
| N-(10-anthryl)-N'-benzoyl-thiourea | 250 | 94 |

The N-aryl-N'-aroyl-thioureas listed in Table II have been prepared in an analogous way starting, however, from m- or p-nitrobenzoyl isothiocyanate.

TABLE II

| Compound | Melting point (° C.) | Yield (percent) |
| --- | --- | --- |
| N-(o-nitrophenyl)-N'-(p-nitrobenzoyl)-thiourea | 159 | 80 |
| N-(m-nitrophenyl)-N'-(p-nitrobenozyl)-thiourea | 226 | 82 |
| N-(p-nitrophenyl)-N'-(p-nigrobenzoyl)-thiourea | 206 | 63 |
| N-(n-nitrophenyl)-N'-(m-nitrobenozyl)-thiourea | 196 | 70 |

Preparation 3: N-(2-biphenylyl)-N'-benzoylthiourea.—A solution of 2 moles of benzoyl isothiocyanate in acetone, prepared as described above is placed in a reaction vessel. With stirring, a solution of 338 g. (2 moles) of o-biphenylylamine in 1500 ml. of acetone is added. The reaction proceeds exothermally and when all the o-biphenylylamine has been added the mixture is refluxed gently for 15 minutes. The products formed remain in solution. While slowly stirring, 1500 ml. of acetone are distilled off rapidly. The residue is cooled in ice. The yellow crystalline precipitate is filtered by suction and dried in a drying oven. Yield: 597 g. (90%). Melting point: 198° C.

Analogous preparation.—N-phenyl-N'-benzoyl - thiourea (yield 82%—melting point: 147° C.) is prepared in an analogous way.

Preparation 4: N-p-tolyl-N'-benzoyl-thiourea.—In a reaction vessel a solution of 2 moles of benzoyl isothiocyanate in acetone is placed. To this solution 214 g. (2 moles) of p-toluidine dissolved in 1700 ml. of acetone is added with stirring. The temperature is kept between 20 and 30° C. by cooling with ice and regulating the addition of the p-toluidine by means of a dropping funnel. The addition lasts about 2 hours. The solution is then evaporated till a volume of about 2 litres whereupon the resulting solution is cooled in ice and the crystalline product formed is filtered by suction. Yield: 450 g. (85%). Melting point: 140° C.

Analogous preparations.—The procedure of preparation 4 is followed for compounds the N-aryl nucleus of which carries electron-donating groups.

(B) Preparation of the Arylthiourea by Alkaline Hydrolysis of the N-Aryl-N'-Aroylthiourea The following preparation illustrates how the arylthioureas are prepared.

Preparation 5: Phenylthiourea.—In a reaction vessel 80 g. of sodium hydroxide (2 moles) are dissolved in 6000 ml. of water. To this solution 512 g. (2 moles) of N-phenyl-N'-benzoylthiourea are added at once. The reaction mixture is refluxed for about 30 minutes whereupon it is cooled to room temperature. The N-phenylthiourea crystallises as white needles whereupon it is filtered by suction and dried in a drying oven. Yield: 274 g. (90%). Melting point: 156° C.

It should be noted that the yield of phenylthiourea obtained according to the method of Frank and Smith is only 76% and the product obtained is impure and should be recrystallised for purification.

Analogous preparations.—All arylthioureas are prepared according to the procedure described in preparation 5.

Some results are listed in Table III.

TABLE III

| Arylthiourea | Yield (percent) | Melting point (° C.) |
| --- | --- | --- |
| p-Tolylthiourea | 93 | 190 |
| o-Biphenylylthiourea | 92 | 198 |
| p-Biphenylylthiourea | 96 | 220 |
| p-Iodophenylthiourea | 95 | 202 |
| p-Bromophenylthiourea | 90 | 132 |
| p-Nitrophenylthiourea | *92 | 245 |
| m-Nitrophenylthiourea | **40 | 167 |
| α-Naphthylthiourea | 98 | 200 |
| β-Naphthylthiourea | 98 | 205 |
| 3,4-dichlorophenylthiourea | 95 | 220 |
| 3,5-di(methoxycarbonyl)-phenylthiourea | 42 | 208 |
| 10-anthrylthiourea | 94 | 250 |
| 2-chrysenylthiourea | 86 | 255 |
| 3-pyrenylthiourea | 87 | 265 |

*Starting from N-(p-nitrophenyl)-N'-(p-nitrobenzoyl)-thiourea.
**Starting from N-(m-nitrophenyl)-N'-(p-nitrobenzoyl)-thiourea, with sodium carbonate (5%) in ethyleneglycol monomethyl ether.

(II) PREPARATION OF THE ARYL ISOTHIOCYANATES

The following preparation illustrates how the aryl isothiocyanates are prepared by pyrolysis of the aryl thiourea in the presence of hydrogen chloride.

Preparation 6: p-Biphenylyl isothiocyanate.—In a reaction vessel 3000 ml. of chlorobenzene are placed. Then 228 g. (1 mole) of p-biphenylylthiourea are added at once. The mixture is refluxed for 6 hours with stirring and introducing hydrogen chloride continuously. Care should be taken that a little excess of hydrogen chloride escapes through the condenser. After cooling, the precipitate formed is filtered by suction and washed with a little chlorobenzene. The filtrate is evaporated till dry and the residue is boiled twice with 1000 ml. of hexane. The boiled mixture is allowed to cool and the residue is filtered by suction. The filtrate is evaporated and the isothiocyanate remains as a crystalline product. Yield: 148 g. (70%). Melting point: 65° C.

In the following Table IV are listed some arylisothiocyanates prepared according to the method of the invention, the yields of which are compared with the yields obtained according to the method described by by Baxter et al. The yields obtained according to the Baxter et al. method are set forth in parenthesis.

TABLE IV

| Compound | Yield (percent) | Reflux time (hours) | Boiling point ° C./mm. Hg | Melting point (° C.) |
| --- | --- | --- | --- | --- |
| p-Tolyl isothiocyanate | 74 (42) | 6 | 116/15 | |
| o-Biphenylyl isothiocyanate | 80 (65) | 6 | 180/8 | |
| p-Biphenylyl isothiocyanate | 70 (50) | 6 | | 65 |
| m-Nitrophenyl isothiocyanate | 66 (—) | 5 | | 58 |
| p-Nitrophenyl isothiocyanate | 78 (11) | 32 | | 110 |
| α-Naphthyl isothiocyanate | 96 (86) | 6 | | 54 |
| β-Naphthyl isothiocyanate | 81 (71) | 6 | | 59 |

We claim:
1. The process of preparing aryl isothiocyanates comprising heating at reflux a monocarbocylicaryl thiourea having from one to four aromatic rings and hydrogen chloride in a solvent selected from the group consisting of chlorobenzene, xylene, and cumene, said hydrogen chloride being introduced to said solvent as a gaseous material in slight excess.

2. The process of claim 1 wherein the gaseous hydrogen chloride is added to said monoaryl-substituted thiourea while said monoaryl-substituted thiourea is being refluxed in said solvent.

3. The process of claim 1 wherein the monoaryl-substituted thiourea is selected from the group consisting of phenylthiourea, p-tolylthiourea, o-biphenylylthiourea, p-biphenylylthiourea, p-iodophenylthiourea, p-bromophenylthiourea, p-nitrophenylthiourea, m-nitrophenylthiourea, α-naphthylthiourea, β-naphthylthiourea, 3,4-dichlorophenylthiourea, 3,4-di(methoxycarbonyl)-phenylthiourea, 3,5-di(methoxycarbonyl)-phenylthiourea, 10-anthrylthiourea, 2-chrysenylthiourea, and 3-pyrenylthiourea.

References Cited

UNITED STATES PATENTS

| | | | |
|---|---|---|---|
| 3,235,580 | 2/1966 | Kühle | 260—454 |
| 3,455,981 | 7/1969 | Nash et al. | 260—454 |

OTHER REFERENCES

Reid, "Organic Chemistry of Bivalent Sulfur" (1966), Chemical Pub. Co., vol. VI, pp. 64–67.

Remy et al., "Treatise on Inorg. Chem." (1956), Elsevier Pub. Co., vol. 1, p. 791, QD 151 R 45 1E.

Le Conte et al., J. Amer. Chem. Soc., vol. 71, 2240–1 (1949).

Baxter et al., J. Chem. Soc., 659–665, (1956).

LEWIS GOTTS, Primary Examiner

G. HOLLRAH, Assistant Examiner

U.S. Cl. X.R.

260—552 R